United States Patent [19]

Shiohara et al.

[11] Patent Number: 4,952,625
[45] Date of Patent: Aug. 28, 1990

[54] PROCESS FOR IMPROVING THE FLOWABILITY OF ULTRAHIGH-MOLECULAR-WEIGHT POLYETHYLENE COMPOSITION

[75] Inventors: Tomoo Shiohara, Kyoto; Hiroshi Abe, Takatsuki, both of Japan

[73] Assignee: Sekisui Kagaku Kogyo Kabushiki Kaisha, Osaka, Japan

[21] Appl. No.: 377,158

[22] Filed: Jul. 10, 1989

Related U.S. Application Data

[63] Continuation of Ser. No. 125,793, Nov. 27, 1987, abandoned, which is a continuation of Ser. No. 9,037, Jan. 16, 1987, abandoned, which is a continuation of Ser. No. 657,962, Oct. 5, 1984, abandoned.

[30] Foreign Application Priority Data

Oct. 7, 1983 [JP] Japan ................... 58-189031
May 18, 1984 [JP] Japan ................... 59-101328
May 30, 1984 [JP] Japan ................... 59-110094

[51] Int. Cl.$^5$ .................. C08J 3/20; C08K 5/01; C08K 5/03
[52] U.S. Cl. .................. 524/586; 524/399; 524/400; 524/487; 524/488; 524/585; 528/491; 528/497
[58] Field of Search ........... 528/491, 497; 525/242, 525/292; 524/585, 586, 587, 399, 400, 487, 488

[56] References Cited

U.S. PATENT DOCUMENTS

| | | | |
|---|---|---|---|
| 2,590,834 | 4/1952 | Faulkner et al. ................... | 524/481 |
| 3,364,284 | 1/1968 | Edmonds et al. ................... | 525/240 X |
| 3,665,068 | 5/1972 | Duling et al. ................... | 524/585 X |
| 3,976,612 | 8/1976 | Kaji et al. ................... | 524/488 X |
| 4,130,618 | 12/1978 | Hill ................... | 524/587 X |
| 4,246,390 | 1/1981 | Seaver ................... | 523/307 X |
| 4,487,875 | 12/1984 | Nakajima et al. ................... | 524/587 X |
| 4,518,552 | 5/1985 | Matsuo et al. ................... | 524/587 X |

FOREIGN PATENT DOCUMENTS

| | | | |
|---|---|---|---|
| 487232 | 10/1952 | Canada ................... | 524/488 |
| 0487232 | 10/1952 | Canada ................... | 524/587 |
| 665886 | 7/1963 | Canada ................... | 524/587 |
| 0665886 | 7/1963 | Canada ................... | 524/587 |
| 3213948 | 10/1982 | Fed. Rep. of Germany ...... | 524/379 |

OTHER PUBLICATIONS

N. Nakajima, "Polymer Molecular Weight Methods", A.C.S. Advances in Chem. Series 125, A.C.S., Washington, DC (1973) pp. 98–107.
CA(98):55116w (1983), p. 55127.
"Modern Plastics Encyclopedia", McGraw-Hill Inc., New York, NY (1980), p. 708.
"Plastics Materials and Processes", S. Schwartz et al., Van Nostrand Reinhold Co., N.Y., pp. 74–75 (1982).
Boyer, "Styrene Polymers" in Encyclopedia of Polym. Sci. and Tech., J. Wiley & Sons, Inc. (1970) pp. 156–157.
Modern Plastics Encyclopedia, J. Agranoff (ed.) McGraw-Hill Inc., N.Y., N.Y. (1980) p. 214.
Schwartz et al., Plastics Materials and Processes, Van Nostrand Reinhold Co, N.Y., 467, 1982.

*Primary Examiner*—Joseph L. Schofer
*Assistant Examiner*—F. M. Teskin
*Attorney, Agent, or Firm*—Wenderoth, Lind & Ponack

[57] ABSTRACT

A process for producing a thermoplastic ultrahigh-molecular-weight polyethylene composition having excellent moldability, which comprises mixing at room temperature to 100° C. an ultrahigh-molecular-weight polyethylene having an average molecular weight of at least 2,000,000 with an amount, effective for acting as a solvent to said polyethylene and improving the flowability of the polyethylene, of a flowability improver selected from the group consisting of (a) styrene, (b) alpha-methylstyrene, (c) chlorinated styrene and (d) a mixture of (a) and (b), wherein the amount of the flowability improver is 3 to 30 parts by weight for styrene and 3 to 30 parts by weight for alpha-methylstyrene and styrene, per 100 parts by weight of the ultrahigh-molecular-weight polyethylene, and optionally admixing at least one member of the group consisting of a pigment, carbon black, a stabilizer, a lubricant and an inorganic filler.

14 Claims, No Drawings

PROCESS FOR IMPROVING THE FLOWABILITY OF ULTRAHIGH-MOLECULAR-WEIGHT POLYETHYLENE COMPOSITION

This application is a continuation of now abandoned application, Ser. No. 07/125,793 filed on Nov. 27, 1987 which is a continuation of now abandoned application Ser. No. 9,037, filed Jan. 16, 1987, which application is, in turn, a continuation of now abandoned application Ser. No. 657,962, filed Oct. 5, 1984.

This invention relates to an ultrahigh-molecular-weight polyethylene composition. More specifically, it relates to a method for producing an ultrahigh-molecular-weight polyethylene composition having good flowability for easy molding while retaining the abrasion resistance and other properties of ultrahigh-molecular-weight polyethylene.

Ultrahigh-molecular-weight polyethylene resins have an average molecular weight of at least one million, and polyethylene having an average molecular weight of as high as 6 million are now produced. Such ultrahigh-molecular-weight polyethylene has high hardness and excellent abrasion resistance. But since it has a strong intermolecular cohesive force, it has poor flowability and is very difficult to mold. Its molding is generally carried out by a press method at high temperatures under elevated pressures. When, however, it is desired to produce an article having a special shape from this polyethylene, it is processed by cutting, and the article cannot be supplied at low cost. Besides the aforesaid press method, attempts have been made to extrude the ultrahigh-molecular-weight polyethylene by a ram extrusion technique or by using a special device having a single or twin screw. The extruding method, however, is not practical because it has low productivity and the cost of production is the same as the press machining method.

Japanese Laid-Open Patent Publication No. 90360/1976 discloses a melt-extruding method in which a resin having a low coefficient of friction and a high melting point, such as ultrahigh-molecular-weight polyethylene, is kneaded and molded by using an improved screw extruder. This technique still fails to achieve an essential improvement in the flowability of the resin. Since the flowability of the molten resin in the extruder remains poor, it can be molded only slowly and by feeding it in small amounts. The productivity is therefore poor, and the cost of production becomes high. Furthermore, this molding method also requires temperatures of as high as 240° to 250° C. as in the aforesaid press method or extruding method. Hence, the resin is thermally decomposed and its molecular weight is reduced. This results in lowered abrasion resistance.

Japanese Laid-Open Patent Publication No. 177036/1982 discloses a technique of adding low-molecular-weight polyethylene having a molecular weight of 5,000 to 20,000 to ultrahigh-molecular-weight polyethylene. Molded articles prepared from the resulting composition, however, have the defect that their abrasion resistance is not sufficient and their heat resistance (softening temperature) is drastically reduced.

Japanese Laid-Open Patent Publication No. 59243/1983 discloses a technique in which the molding of ultrahigh-molecular-weight polyethylene by adding about 30% of an alicyclic hydrocarbon polymer. The flowability of this polyethylene is improved to some extent by its dilution with the added polymer, but is still insufficient. Furthermore, molding by this method can be applied only to limited types of an extrusion molding machine. It also has the defect that the concentration of the ultrahigh-molecular-weight polyethylene itself becomes low and its chemical resistance and abrasion resistance are deteriorated.

It is strongly desired therefore to develop an easily moldable ultrahigh-molecular-weight polyethylene composition having excellent flowability without a deterioration in the abrasion resistance and chemical resistance of ultrahigh-molecular-weight polyethylene.

It is a primary object of this invention to provide a process for producing an ultrahigh-molecular-weight polyethylene composition which is free from the aforesaid defects of the prior art and is rendered easy to mold by imparting excellent flowability without reducing the abrasion resistance and chemical resistance of ultrahigh-molecular-weight polyethylene.

Another object of this invention is to provide a process for producing an ultrahigh-molecular-weight polyethylene composition which, because of its excellent flowability, can be molded into thin-walled articles at low cost.

In one aspect, this invention provides an ultra-high-molecular-weight polyethylene composition comprising ultrahigh-molecular-weight polyethylene having an average molecular weight of at least 1,000,000 and an amount, effective for improving the flowability of the polyethylene, of a flowability improver selected from the group consisting of styrene, alpha-methylstyrene, chlorinated styrene and their oligomers, wherein the amount of the flowability improver is 3 to 100 parts by weight for styrene, 3 to 30 parts by weight for at least one compound selected from the group consisting of alpha-methylstyrene, and styrene, and 3 to 10 parts by weight for a styrene oligomer, per 100 parts by weight of the ultrahigh-molecular-weight polyethylene.

In another aspect, the above ultrahigh-molecular-weight polyethylene composition further comprises a lubricant selected from the group consisting of waxes and fatty acid metal soaps.

In the present invention, the flowability improvers may be used singly or as a mixture.

The styrene oligomer used in this invention is a low polymer of styrene and preferably has an average molecular weight of 300 to 5,000. If the average molecular weight exceeds 5,000, the abrasion resistance, solvent resistance and chemical resistance of the resulting composition are reduced. If the average molecular weight is less than 300, the oligomer of such a molecular weight is difficult, and it is also difficult to obtain from the market.

The metal moiety of the fatty acid metal soaps used in this invention as the lubricant includes those of Groups IIa and IIb of the periodic table, such as magnesium, calcium, strontium, barium, zinc, cadmium and lead. The fatty acid moiety is an organic monocarboxylic acid having 10 to 32 carbon atoms, such as stearic acid and montanic acid. Salts of the organic monocarboxylic acids and the above metals are used as the fatty acid metal soaps. The metal salts may be used as a mixture so long as the number of carbon atoms of the mixture is within the aforesaid range.

The waxes as the lubricant are hydrocarbon waxes, such as paraffin wax, microwax, and polyethylene wax. Those having a melting point of 100° to 120° C. are preferred. These waxes may be used as a mixture. Mixtures of the fatty acid metal salts and the waxes may also be used.

The fatty acid metal soaps and waxes act as lubricants, and smoothen the contacting of the composition with the surface of a molding machine during molding and enable the molding operation to be carried out smoothly. This results in molded articles having a smooth and glossy surface.

The amount of the lubricant to be added is 0.5 to 10 parts by weight, preferably 0.5 to 5 parts by weight, more preferably 1 to 3 parts by weight, per 100 parts by weight of the ultrahigh-molecular-weight polyethylene If its amount is below 0.5 part by weight, the lubricant cannot perform its function effectively. If it exceeds 10 parts by weight, various properties such as abrasion resistance and chemical resistance of the resulting molded article tend to be deteriorated.

The amount of the flowability improver should be selected depending upon its type. If it is below the specified limit, the object of this invention cannot be achieved. If it exceeds the specified limit, the abrasion resistance and chemical resistance of the resin are markedly reduced.

The flowability improver used in this invention acts as a solvent for the ultrahigh-molecular-weight polyethylene, and imparts flowability to it. Furthermore, the heat applied induces polymerization of the flowability improver. At high temperatures, the flowability improver or a polymer thereof acts as a solvent for the ultrahigh-molecular-weight polyethylene and changes completely to a polymer under the influence of remaining heat after molding. Since the polymer solidifies upon cooling to room temperature and has a network structure and moderate strength, it does not impair the inherent abrasion resistance and chemical resistance of the ultrahigh-molecular-weight.

The styrene monomer used in this invention is included in an amount of 3 to 100 parts by weight, preferably 3 to 20 parts by weight, per 100 parts by weight of ultrahigh-molecular-weight polyethylene.

The alpha-methylstyrene monomer, another preferred example of the flowability improver used in this invention, may be added to the ultrahigh-molecularweight polyethylene either singly or as a mixture with styrene monomer. In the monomeric mixture, the ratio of alpha-methylstyrene to styrene is preferably from 1:9 to 9:1. The amount of alpha-methylstyrene or the mixture of it with styrene is 3 to 30 parts by weight, per 100 parts by weight of the ultrahigh-molecular-weight. If it is less than 3 parts by weight, no flowability improving effect is obtained. If it exceeds 30 parts by weight, the abrasion resistance and solvent resistance of the resin are reduced.

Chlorinated styrene is used in an amount of 3 to 30 parts by weight per 100 parts by weight of the ultrahigh-molecular-weight polyethylene.

A styrene oligomer, another example of the flowability improver, is used in an amount of 3 to 10 parts by weight, per 100 parts by weight of the ultrahighmolecular-weight polyethylene. When the styrene oligomer is used as the flowability improver, it is particularly desirable to use the aforesaid lubricant together. The combined use of the lubricant is preferred because it increases the moldability of the polyethylene at relatively low molding temperatures, for example about 200° to about 230° C.

Conventional additives such as pigments, carbon black, stabilizers and inorganic fillers may be added in amounts which do not adversely affect the properties of the final molded product.

Since the flowability improver can be converted to a polymer upon heating, it can improve the flowability of the ultrahigh-molecular-weight polyethylene without impairing its excellent properties such as abrasion resistance and chemical resistance and the polymer can be easily molded. Consequently, the productivity in the molding process increases, and molded articles can be supplied at low prices. When the composition of this invention further contains the fatty acid metal soap or wax as the lubricant, its flowability further increases and therefore the moldability is improved.

The composition of this invention is useful in fields requiring abrasion resistance, for example as gears, bearings, separation shaker boxes, and lining sheet materials for truck luggage carriers and storage bins, and prunting rolls and fields requiring chemical resistance, for example as materials for molding tanks for holding chemicals such as a development tray or a box for holding an etching agent.

The following examples illustrate the present invention more specifically. All parts in these examples are by weight.

EXAMPLE 1

One hundred parts of polyethylene having an average molecular weight of 2,000,000 and 5 parts of styrene monomer were mixed at 100° C. in a supermixer. The mixture was extruded at 240° to 260° C. by a twin-screw extruder with a screw diameter of 30 mm to form a sheet having a width of 15 cm and a thickness of 2 mm. The extrusion speed and the amount of extrusion (the weight of the sheet) per minute were measured.

Foundry sand having a size of 200 mesh was impinged from a nozzle perpendicularly against the sheet and the amount of abrasion per 100 g of the sheet was measured.

EXAMPLE 2

Example 1 was repeated except that 3 parts of calcium montanate was further added in preparing the mixture.

COMPARATIVE EXAMPLE 1

Polyethylene having an average molecular weight of 2,000,000 was fed into a supermixer, and treated in the same way as in Example 1. A sheet-like molded article of the polyethylene could not be obtained.

COMPARATIVE EXAMPLE 2

Example 1 was repeated except that polypropylene alone was molded.

COMPARATIVE EXAMPLE 3

Example 1 was repeated except that polyethylene having an average molecular weight of 2,000,000 alone was compression-molded at 240° C. instead of extruding it.

EXAMPLE 3

Example 1 was repeated except that polyethylene having an average molecular weight of 6,000,000 was used, the amount of the styrene monomer was changed to 3 parts, and 1 part of barium stearate was further added in preparing the mixture.

EXAMPLE 4

Example 1 was repeated except that polyethylene having an average molecular weight of 6,000,000 was used, the amount of the styrene monomer was changed to 10 parts, and 3 parts of barium stearate was further added in preparing the mixture.

EXAMPLE 5

Example 1 was repeated except that polyethylene having an average molecular weight of 6,000,000 was used, the amount of the styrene monomer was changed to 50 parts, and 3 parts of barium stearate was further used in preparing the mixture.

EXAMPLE 6

Example 1 was repeated except that polyethylene having an average molecular weight of 6,000,000 was used, the amount of the styrene monomer was changed to 100 parts, and 5 parts of barium stearate was further added in preparing the mixture.

COMPARATIVE EXAMPLE 4

Example 1 was repeated except that polyethylene having an average molecular weight of 6,000,000 was used, and the amount of the styrene monomer was changed to 120 parts.

COMPARATIVE EXAMPLE 5

Example 1 were repeated except that polyethylene having an average molecular weight of 6,000,000 was used, and the styrene monomer was not used and 3 parts by weight of barium stearate was added in preparing the mixture. A sheet-like molded article of the polymer could not be obtained.

COMPARATIVE EXAMPLE 6

Example 1 was repeated except that polyethylene having an average molecular weight of 6,000,000 alone was molded. A sheet-like molded aricle of the polymer could not be obtained.

COMPARATIVE EXAMPLE 7

Example 1 was repeated except that polyethylene having an average molecular weight of 200,000 alone was molded.

COMPARATIVE EXAMPLE 8

Example 1 was repeated except that 100 parts of polyethylene having an average molecular weight of 200,000 and 3 parts of barium stearate were molded.

The test results obtained in Example 1 to 6 and Comparative Examples 1 to 8 are summarized in Table 1.

TABLE 1

| | Extrusion speed (cm/min.) | Amount of extrusion (g) | Bulk density | Amount of abrasion (g/100 g) After impinging for 3 min. | After impinging for 6 min. |
|---|---|---|---|---|---|
| Ex. 1 | 32.0 | 24.0 | 0.48 | 1.14 | 1.26 |
| Ex. 2 | 35.0 | 28.0 | 0.45 | 1.18 | 1.31 |
| CEx. 1 | 0.0 | 0.0 | — | — | — |
| CEx. 2 | 38.0 | 32.0 | 0.52 | — | — |
| CEx. 3 | — | — | — | 1.10 | 1.18 |
| Ex. 3 | 24.0 | 20.4 | — | 0.88 | — |

TABLE 1-continued

| | Extrusion speed (cm/min.) | Amount of extrusion (g) | Bulk density | Amount of abrasion (g/100 g) After impinging for 3 min. | After impinging for 6 min. |
|---|---|---|---|---|---|
| Ex. 4 | 29.6 | 25.0 | — | 0.10 | — |
| Ex. 5 | 33.0 | 28.1 | — | 1.77 | — |
| Ex. 6 | 45.0 | 38.2 | — | 2.10 | — |
| CEx. 4 | 1.7 | 1.45 | — | 10.8 | — |
| CEx. 5 | 0.0 | 0.0 | — | — | — |
| CEx. 6 | 0.0 | 0.0 | — | — | — |
| CEx. 7 | 3.0 | 26.9 | — | 11.0 | — |
| CEx. 8 | 3.0 | 30.0 | — | 12.3 | — |

Ex. = Example;
CEx. = Comparative Example

EXAMPLES 7-8 AND COMPARATIVE EXAMPLES 9-11

Polyethylene having an average molecular weight of 2,000,000 or 6,000,000 and alpha-methylstyrene monomer or both alpha-methylstyrene monomer and styrene monomer were mixed in a supermixer in the proportions shown in Table 2 for 10 minutes to form a mixture.

The mixture was fed into a flow tester having a nozzle with a diameter of 1 mm and a length of 10 mm and the shear speed and the apparent viscosity (flowability) of the mixture were measured. The results are shown in Table 2.

The resulting mixture was also fed into a twin-screw extruder having a screw diameter of 30 mm and molded into a sheet having a width of 15 cm and a thickness of 2.5 mm. The prescribed temperature at the tip portion of the extruder screws, the load during extrusion, the extruding condition and the appearance of the resulting sheet are shown in Table 2.

The abrasion resistance of the sheet was also measured, and the results are shown in Table 2. The abrasion resistance was determined by impinging foundry sand having a size of 100 mesh from a nozzle perpendicularly against a sample sheet having a thickness of 2.5 mm, a width of 5 cm and a length of 7 cm for 3 minutes and measuring the amount of abrasion per 100 g of the sheet.

EXAMPLE 9

One hundred parts of polyethylene having an average molecular weight of 6,000,000, 5 parts of alpha-methylstyrene, 5 parts of styrene monomer and 0.5 part of calcium montanate were fed into a supermixer, and mixed at a temperature ranging from room temperature to 80° C. for 15 minutes. Otherwise, the same procedure as in Example 7 was repeated. The results are shown in Table 2.

COMPARATIVE EXAMPLE 12

Polyethylene having an average molecular weight of 1,000,000 alone was subjected to the flow tester in the same way as in Example 7, but its flowability could not be measured. It could neither be molded by extrusion through an extruder.

Accordingly, it was pressed for 7 minutes under 100 atmospheres to obtain a sheet having a thickness of 2.5 mm. The abrasion resistance of the sheet was determined as in Example 7, and the results are shown in Table 2.

TABLE 2

|  |  |  | Example | | Comparative Example | | |
|---|---|---|---|---|---|---|---|
|  |  |  | 7 | 8 | 9 | 10 | 11 |
| Polyethylene (molecular weight 2 millions) | | | 100 | — | 100 | — | — |
| Polyethylene (molecular weight 6 millions) | | | — | 100 | — | 100 | 100 |
| Alpha-methyl styrene | | | 5 | 4.5 | 2 | 0.1 | 38 |
| Styrene | | | — | 10.5 | — | 1.9 | 2 |
| Calcium montanate | | | — | — | — | — | — |
| Flowability | 200° C. 20 kg | Shear speed (sec$^{-1}$) | 0.05 | 0.08 | Measurement impossible | 0.03 | 0.001 |
|  |  | Apparent viscosity (poises) | $5 \times 10^7$ | $1.1 \times 10^6$ |  | $3.8 \times 10^7$ | $2.5 \times 10^7$ |
|  | 230° C. 40 kg | Shear speed | 0.2 | 0.4 | $0.5 \times 10^{-9}$ | 0.1 | 4.0 |
|  |  | Apparent viscosity | $5 \times 10^6$ | $4 \times 10^6$ | $2 \times 10^{10}$ | $2.3 \times 10^7$ | $5.7 \times 10^6$ |
|  | 230° C. 60 kg | Shear speed | 0.5 | 1.0 | $0.8 \times 10^{-8}$ | 0.8 | 5.4 |
|  |  | Apparent viscosity | $2 \times 10^6$ | $6 \times 10^6$ | $5 \times 10^9$ | $4.3 \times 10^6$ | $6 \times 10^5$ |
| Extrudability | Conditions | Screw temperature (°C.) | 200 | 230 | 200 | 230 | 230 |
|  |  | Load (Ampere) | 10 | 9 | 21 | 16 | 12 |
|  | State of extrusion | | Smooth | Smooth | No sheet was formed | Intermittently Undulated | Intermittently Undulated |
|  | Appearance of the sheet | | Smooth | Small undulation | No sheet was formed |  |  |
| Abrasion resistance (g) | | | 0.98 | 0.92 | — | 1.09 | 1.62 |

|  |  |  | Example 9 | Comparative Example 12 |
|---|---|---|---|---|
| Polyethylene (molecular weight 2 millions) | | | — | 100 |
| Polyethylene (molecular weight 6 millions) | | | 100 | — |
| Alpha-methyl styrene | | | 5 | — |
| Styrene | | | 5 | — |
| Calcium montanate | | | 0.5 | — |
| Flowability | 200° C. 20 kg | Shear speed (sec$^{-1}$) | 0.2 | Measurement impossible |
|  |  | Apparent viscosity (poises) | $4.9 \times 10^6$ |  |
|  | 230° C. 40 kg | Shear speed | 1.2 |  |
|  |  | Apparent viscosity | $2 \times 10^6$ |  |
|  | 230° C. 60 kg | Shear speed | 4.5 |  |
|  |  | Apparent viscosity | $7.3 \times 10^5$ |  |
| Extrudability | Conditions | Screw temperature (°C.) | 230 | Press-forming |
|  |  | Load (Ampere) | 9.5 |  |
|  | State of extrusion | | Smooth |  |
|  | Appearance of the sheet | | Small undulation |  |
| Abrasion resistance (g) | | | 1.1 | 1.02 |

EXAMPLES 10–12 AND COMPARATIVE EXAMPLES 13–15

Polyethylene having an average molecular weight of 2,000,000, styrene oligomer having an average molecular weight of 300 (Piccolastic 300, a product of Exxon Chemical Co.) and a hydrocarbon wax (Highwax 220MP, a product of Mitsui Petrochemical Industries, Ltd.) in the proportions (parts) shown in Table 3) were fed into a supermixer and mixed at a temperature ranging from room temperature to 80° C. for 15 minutes.

The resulting mixture was fed into a twin-screw extruder (screw diameter 40 mm; L/D=26.6) and molded into a sheet having a thickness of 1.0 mm and a width of 15 cm. The tip portion of the extruder screws was kept at 260° C., and the extrusion speed (the linear speed at the extrusion port) was measured. The abrasion resistance was determined in the same way as in Example 7 using a sample sheet having a thickness of 1.0 mm, a width of 5 cm and a length of 7 cm. The results are shown in Table 3.

TABLE 3

|  | Example | | | Comparative Example | | |
|---|---|---|---|---|---|---|
|  | 10 | 11 | 12 | 13 | 14 | 15 |
| Polyethylene | 100 | 100 | 100 | 100 | 100 | 100 |
| Styrene oligomer | 10 | 5 | 3 | 2 | — | — |
| Hydrocarbon wax | 3 | 3 | 3 | 3 | 3 | — |
| Extrusion speed (m/min.) | 15 | 10 | 7 | 0.08 | 0.06 | 0.02 |
| Abrasion resistance (g) | 0.99 | 0.96 | 0.94 | 0.94 | 1.06 | 0.93 |

EXAMPLES 13–15 AND COMPARATIVE EXAMPLES 16–19

Polyethylene having an average molecular weight of 6,000,000, styrene oligomer having an average molecular weight of 300, 1,000 or 5,000 (Piccolastic 300, 1000 or 5000 produced by Exxon Chemical Co.) and calcium stearate in the proportions (parts) shown in Table 4 were mixed and extruded by an extruder in the same way as in Example 10. The extrusion speed and the amount of abrasion were also measured in the same way as in Example 10. The results are shown in Table 4.

TABLE 4

|  | Example | | | Comparative Example | | | |
|---|---|---|---|---|---|---|---|
|  | 13 | 14 | 15 | 16 | 17 | 18 | 19 |
| Polyethylene | 100 | 100 | 100 | 100 | 100 | 100 | 100 |
| Piccolastic 300 | 5 | 5 | — | — | — | 2 | 2 |
| Piccolastic 1000 | — | 5 | — | — | — | — | — |
| Piccolastic 5000 | — | — | 5 | — | — | — | — |
| Calcium stearate | 3 | 3 | 3 | — | 3 | — | 3 |
| Extrusion speed (m/min.) | 8.5 | 5 | 3 | Could not be extruded | | | |
| Abrasion resistance (g) | 0.91 | 0.91 | 0.91 | — | — | — | — |

EXAMPLES 16–18 AND COMPARATIVE EXAMPLES 20–22

One hundred parts of polyethylene having an average molecular weight of 2,000,000 or 6,000,000 and 3 to 30 parts of p-chlorostyrene were mixed with stirring for 15 minutes in a supermixer at a temperature of 60° to 70° C.

The resulting composition was tested in the same way as in Example 7. For comparison, the same tests were conducted on a composition not containing p-chlorostyrene and a composition containing 50 parts of p-chlorostyrene. The specimen used in testing extrudability and abrasion resistance was an extruded sheet having a thickness of 3 mm and a width of 10 cm.

The results are shown in Table 5.

TABLE 5

|  |  | Example | | | Comparative Example | | |
|---|---|---|---|---|---|---|---|
|  |  | 16 | 17 | 18 | 20 | 21 | 22 |
| Polyethylene (molecular weight 2 millions) | | 100 | — | 100 | 100 | — | 100 |
| Polyethylene (molecular weight 6 millions) | | — | 100 | — | — | 100 | — |
| p-Chlorostyrene | | 3 | 30 | 10 | — | 50 | 50 |
| Apparent viscosity (poises) | 200° C. 20 kg | $4.6 \times 10^7$ | $1.6 \times 10^7$ | $6 \times 10^7$ | Measurement impossible | $1.8 \times 10^6$ | $8 \times 10^6$ |
|  | 230° C. 40 kg | $8.3 \times 10^6$ | $3.5 \times 10^7$ | $9.4 \times 10^6$ | $4 \times 10^{10}$ | $4.1 \times 10^6$ | $8.4 \times 10^6$ |
|  | 230° C. 60 kg | $8.7 \times 10^6$ | $4.3 \times 10^6$ | $11 \times 10^6$ | $5.5 \times 10^6$ | $2.8 \times 10^6$ | $10.3 \times 10^6$ |
| Extrudability | Screw temperature (°C.) | 200 | 200 | 200 | 200 | 230 | 200 |
|  | Load (Ampere) | 10 | 10 | 10 | 30 | 50 | 45 |
|  | State of extrusion | Surface smooth | Surface smooth | Surface smooth | Could not be molded into a sheet | Cracks occurred discontinuously | Cracks occurred discontinuously |
| Abrasion resistance (g) | | 0.94 | 0.90 | 0.97 | — | 2.44 | 3.18 |

What is claimed is:

1. A process for producing a thermoplastic ultrahigh-molecular-weight polyethylene composition having excellent moldability, which comprises mixing at room temperature to 100° C. an ultrahigh-molecular-weight polyethylene having an average molecular weight of at least 2,000,000 with an amount of a flowability improver selected from the group consisting of (a) styrene, (b) alpha-methylstyrene, (c) chlorinated styrene and (d) a mixture of (a) and (b), wherein the amount of the flowability improver is 3 to 100 parts by weight for styrene and 3 to 30 parts by weight for alpha-methylstyrene, chlorinated styrene or a mixture of alpha-methylstyrene and styrene, per 100 parts by weight of the ultrahigh-molecular-weight polyethylene, and wherein the amount of the flowability improver is effective for acting as a solvent to the polyethylene and for improving the flowability of the polyethylene.

2. A process according to claim 1 wherein the ratio of alpha-methylstyrene to styrene in said mixture of these compounds is from 1:9 to 9:1.

3. A process according to claim 1 which further comprises incorporating a lubricant selected from the group consisting of waxes and fatty acid metal soaps.

4. A process according to claim 3 wherein the wax is paraffin wax.

5. A process according to claim 3 wherein the fatty acid metal soaps are magnesium, calcium strontium, barium zinc and cadmium salts of organic monocarboxylic acids having 10 to 32 carbon atoms.

6. A process according to claim 5 wherein the organic carboxylic acids are stearic and montanic acid.

7. A process according to claim 3 wherein the lubricant is included in an amount of 0.5 to 10 parts by weight per 100 parts by weight of the ultrahigh-molecular-weight polyethylene.

8. A process according to claim 1, which further comprises incorporating a pigment into the polyethylene.

9. A process according to claim 1, which further comprises incorporating a carbon block into the polyethylene.

10. A process according to claim 1, which further comprises incorporating a stabilizer into the polyethylene.

11. A process according to claim 1, which further comprises incorporating a lubricant into the polyethylene.

12. A process according to claim 1, which further comprises incorporating an inorganic filler into the polyethylene.

13. A process according to claim 3, wherein the wax is microwax.

14. A process according to claim 3, wherein the wax is polyethylene wax.

* * * * *